UNITED STATES PATENT OFFICE.

ORAZIO LUGO, OF FLUSHING, AND WILLIAM T. LEES, OF BROOKLYN, N. Y.

IMPROVEMENT IN PURIFYING ILLUMINATING-GAS.

Specification forming part of Letters Patent No. 222,715, dated December 16, 1879; application filed October 30, 1879.

*To all whom it may concern:*

Be it known that we, ORAZIO LUGO, of Flushing, in the county of Queens, and WILLIAM T. LEES, of the city of Brooklyn, in the county of Kings, State of New York, have invented certain new and useful Improvements in the Purifying of Illuminating-Gas; and we do hereby declare that the following is a full, clear, and exact description of the invention, which will enable others skilled in the art to which it appertains to make and use the same.

The chemistry of illuminating-gas has been sufficiently developed by chemists to enable the gas-manufacturer to apply intelligently those economical improvements which produce a gas free from deleterious substances.

Illuminating-gas is manufactured generally by the destructive distillation of carbonaceous materials containing a large percentage of volatile matter. The distillate consists of several compounds, differing in their nature and quantity according to the substance submitted to distillation, as well as to the degree of heat used during the operation.

Bituminous coal is largely used for the manufacture of illuminating-gas; but it produces, besides gaseous hydrocarbons, several deleterious substances—such as sulphur and ammoniacal compounds—which should be totally extracted before the gas is delivered to the consumer.

The object of our invention is to enable the gas-manufacturer thoroughly to extract from the illuminating-gas these sulphur and ammoniacal compounds in a practical and economical manner; and to this end our invention consists, generally, in heating crude gas by itself before it is scrubbed or washed, and particularly with a gas, mixture, vapor, or vaporizable substance, which will form, with the sulphur of the gas, soluble sulphur compounds upon the application of heat.

The invention consists, specifically, in introducing atmospheric air or caustic ammonia into the gas, preferably at a point between the condenser and scrubber, heating the mixture, and then washing—that is, heating before the gas is either scrubbed or passed through a purifying substance.

To carry our invention into effect, inasmuch as crude gas already contains a substance—to wit, ammonia—which converts sulphur and its insoluble compounds into soluble sulphur compounds when heat is applied, we may simply heat such gas, and convert much of the sulphur contained into soluble compounds of sulphur, the conversion being dependent upon the quantity of ammonia present; or we may heat the gas with any gas, mixture, vapor, or wholly or partly vaporizable substance which will convert the sulphur or its insoluble compounds into soluble sulphur compounds; or we introduce about one to two per cent. of atmospheric air into the gas at any convenient place between the retorts and the condenser, and between the condenser and the scrubber we superheat the mixture to a temperature of about 250° centigrade, by passing it through a heated chamber. We prefer to pass the gas through a tubular iron vessel kept at the required temperature by superheated steam. After passing through the heated chamber (which we will call the "gas-superheater") the gas is scrubbed with water, and then passed through a purifying material, in order to take out the last traces of impurities. We have also tried caustic ammonia, introduced into the gas after being passed through the condenser, then superheating the mixture to about 250° to 270° centigrade. The results were very satisfactory. The gas when thus treated needed only to be washed with water to render it sufficiently free from sulphur and ammoniacal compounds.

We may employ a substance or substances from which ammonia can be generated upon the application of heat.

By this process the purifying of the gas is done by the water used, as the sulphur compounds contained in the crude gas are modified during the superheating process, and become soluble in water.

When the mixture of crude gas and atmospheric air is superheated to about the temperature above mentioned, a large quantity of free sulphur is deposited as the gas becomes cool. In connection with this reaction, we have noticed the total decomposition of the very objectionable naphthaline. We could not detect a trace either of naphthaline or of any other solid hydrocarbon in the gas purified by our process.

The crude gas we operated upon contained one hundred and eighty grains of sulphur (S) and three hundred and thirty-three grains of ammonia ($NH_3$) to the one hundred cubic feet. The same gas, after being purified by our method, contained only three grains of sulphur (S) to the one hundred cubic feet, and not a trace of ammonia. We found most of the sulphur compounds in the water coming from the washer and scrubber in the form of sulpho-carbonate of ammonia, sulpho-cyanate of ammonia, and sulphide of ammonium. We also found a considerable quantity of sulphate of ammonia deposited with the free sulphur in the cooler-pipes between the gas superheater and scrubber.

A small quantity of sulphide of hydrogen escapes the reaction during the superheating of the gas, but is easily retained by passing the gas through bone-black or any other suitable substance—such as lime, iron, or manganese.

The method above described can be applied to the purification of coal-gas, water-gas, and all other kinds of gas containing sulphur.

Having described our invention, what we claim, and desire to secure by Letters Patent of the United States, is—

1. In purifying gas, the process of converting the sulphur contained in crude gas into soluble sulphur compounds for removal, which consists in heating the crude gas by itself between the place of its generation and the washer.

2. In the purification of gas, the process of converting the sulphur or sulphur compounds contained therein into soluble compounds of sulphur readily removable from the gas, which consists in introducing into the gas a gas, mixture, vapor, or vaporizable substance which will form with the sulphur of the gas soluble sulphur compounds upon the application of heat, and then heating the mixture, substantially as described.

3. The process of purifying illuminating-gas, freeing it from sulphur and ammonia, which consists in introducing into the gas a gas, mixture, or vapor—such as air or caustic ammonia—which will form, with the sulphur of the gas, soluble sulphur compounds, heating the mixture, and then washing, substantially as set forth.

ORAZIO LUGO.
WM. T. LEES.

Witnesses:
THOMAS K. LEES,
A. W. BAILEY.